Aug. 9, 1932.  H. C. HAEBERLE ET AL  1,871,053
SPEEDOMETER TESTING MACHINE
Filed March 11, 1931  2 Sheets-Sheet 1
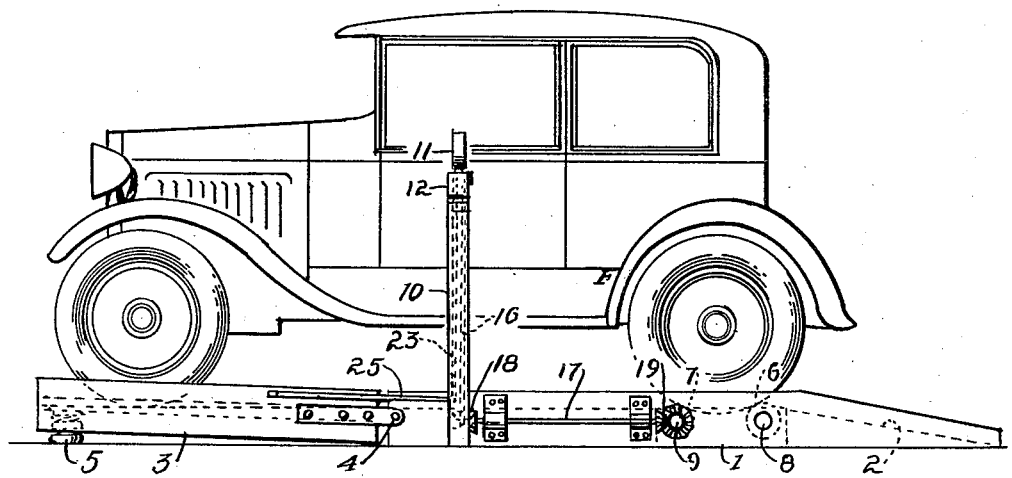
FIGURE 1
FIGURE 2
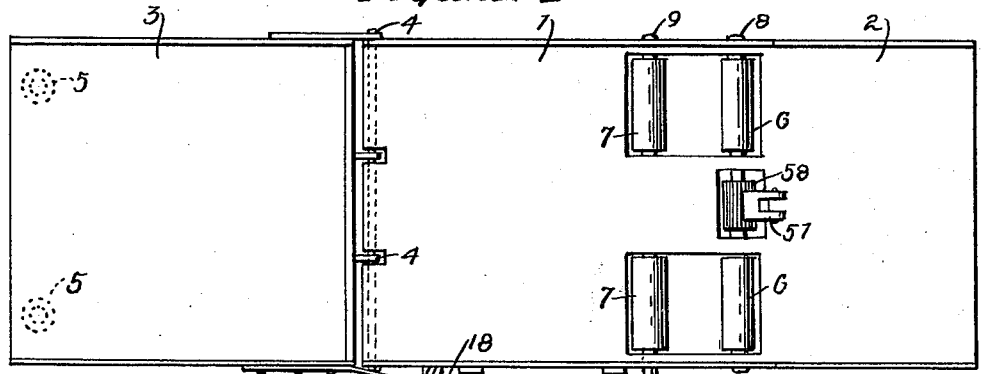
FIGURE 3
INVENTORS
Henry C. Haeberle
Clarence T. Harrington
John A. Naismith
ATTORNEY

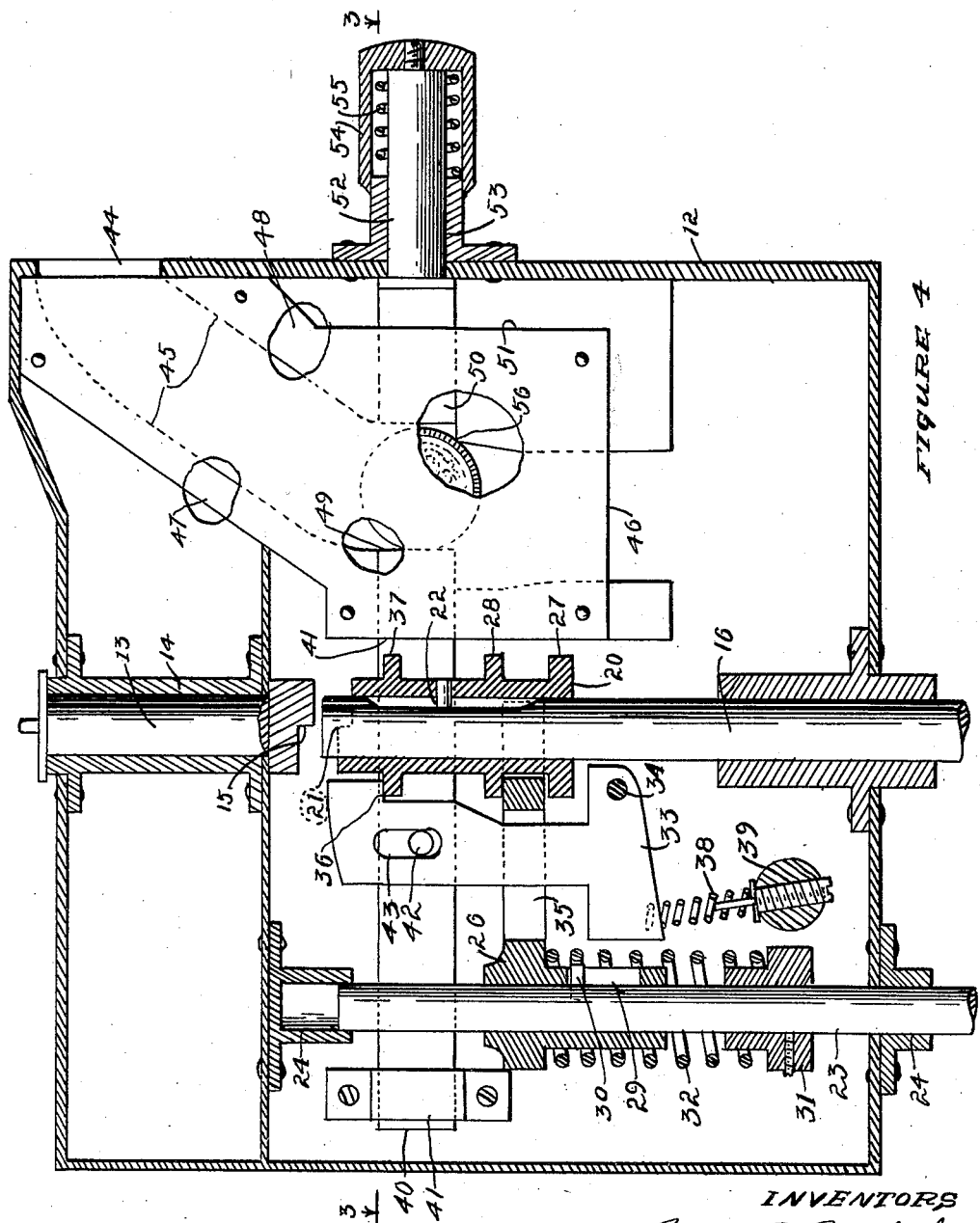

Patented Aug. 9, 1932

1,871,053

UNITED STATES PATENT OFFICE

HENRY C. HAEBERLE AND CLARENCE T. HARRINGTON, OF SAN JOSE, CALIFORNIA

SPEEDOMETER TESTING MACHINE

Application filed March 11, 1931. Serial No. 521,675.

It is the object of the present invention to provide a machine for testing the speedometer of an automobile so constructed and operated that the operator of the car himself may render it operative by driving his car thereon and depositing a suitable coin therein.

It is also an object of the invention to provide a machine of the character indicated that will be economical to manufacture, of few parts, simple in form and construction, strong, durable, and highly efficient in its practical application, In the drawings:

Figure 1 is a side elevation of a device embodying our invention.

Figure 2 is a plan view of the same.

Figure 3 is a sectional view on line 3—3 of Figure 4.

Figure 4 is a sectional view on line 4—4 of Figure 3.

In the form of the invention herein disclosed, we show at 1 a fixed platform with an inclined approach at 2, and at 3 a platform portion pivoted to part 1 as at 4 with its free end supported upon strings as 5 to normally support it in an upwardly inclined position relative to part 1.

At 6 and 7 are two sets of rollers arranged in spaced relation to each other on parallel shafts 8 and 9 journaled in part 1 adjacent the inclined part 2 and below the surface of part 1 as shown whereby the rear wheels of an automobile driven upon the structure will rest upon the rollers in a position to drive shaft 9, the forward portion of the car resting upon the forward portion 3 and depressing it for the purpose hereinafter set forth.

Close beside the platform 1 is mounted a vertically disposed support 10 having a speedometer 11 mounted thereon through the medium of a case or housing 12 into which its operating shaft 13 extends through a bearing 14. The end of shaft 13 in case 12 is shaped as shown at 15 to form one portion of a clutch.

The speedometer is operated from roller shaft 9 by means of shafts 16 and 17 geared to each other as at 18 and to shaft 9 as at 19. Normally there is no driving connection between shafts 16 and 13, but such a connection may be established by means of a sleeve 20 on shaft 16 having one end shaped to form a clutch portion 21 complementary to clutch portion 15. Relative rotation of sleeve 20 and shaft 16 is prevented by an engaging pin and slot construction as shown at 22.

It is desirable that the clutch be operated only when an automobile is upon the platform 1—3 and after a suitable coin has been deposited in the housing 12, and this is accomplished in the following manner.

A push-rod 23 is mounted in bearings 24 in housing 12 and extends below the housing to a point adjacent the platform 1—3 where it rests over a bar 25 mounted on platform portion 3 as shown. A yoke 26 is slidably mounted on push-rod 23 and engages sleeve 20 between flanges 27 and 28, and is also provided with a slot 29 engaging a pin 30 in rod 23. Fixedly mounted on rod 23 below yoke 26 is a collar 31, and at 32 is a spring bearing against yoke 26 and collar 31. The spring 32 and slot and pin structure 29—30 are so proportioned and arranged that the spring is normally not under tension.

A detent is shown at 33 pivotally mounted in the case at 34 and extending upwardly through a slot 35 in yoke 26 and provided with a shoulder 36 adapted to engage a flange 37 on sleeve 20, and the detent is urged into such an engagement by means of a spring 38 engaging its lower edge and bearing against a support 39. When the detent is so engaged an upward movement of push-rod 23 merely serves to place spring 32 under tension, but when the detent is released then the expansion of spring 32 serves to force the yoke 26 upwardly thereby moving the sleeve 20 upwardly to engage the clutch 21—15. These elements are returned to their normal positions by their own weight when the car leaves platform 1—3.

The detent 33 is disengaged from sleeve 20 by means of a bar 40 slidably mounted in case 12 as at 41—41 and carrying a pin 42 engaging slot 43 in the said detent 33. In order that the bar 40 may be operated only by depositing a suitable coin a coin slot is formed with an entrance at 44 and having the conformation indicated by the dotted lines 45, the adjacent side of case 12 forming one side of the slot, a plate 46 forming the inside of the slot, and parts 47—48 forming the edges of the slot and having a thickness corresponding substantially to that of the coin to be used. The bar 40 terminates at the slot at 49, and another bar portion 50 is slidably mounted between case 12 and plate 46 and in alignment with bar 40, its forward movement being limited by the edge 51 of plate 46. On the outer end of bar 50 is mounted a pin 52 passing outwardly of the case 12 through bearing 53. On pin 52 is mounted a cap 54 overlying bearing 53, and a spring 55 is mounted in the cap to bear against the same and the end of bearing 53. A coin dropped into slot 45 is caught between the end of bar 40 and corner 56 of part 48, so that when bar 50 is pushed inwardly the bar 40 is likewise operated through the medium of the coin which drops down into the case 12 when the pressure on bar 50 is released. The outward movement of bar 50 is limited by the wall of the case itself, and its inward movement is limited by the edge 51 of plate 46.

Assuming the structure to have been constructed as described and the driver of an automobile is desirous of ascertaining whether or not his speedometer is functioning accurately. The car is driven upon the platform structure 1—3 with its drive wheels resting upon the rollers as shown. Since the front of the car rests upon platform portion 3 its weight depresses the portion 3 causing the bar 23 to operate the push-rod 23, thereby placing the spring 32 under tension. The driver now places a coin in slot 45 and then pushes inwardly on bar 50 thereby imparting a sliding movement to bar 40 and causing pin 42 to throw detent 33 out of engagement with sleeve 20, and permitting the spring 32 to force the yoke 23 and sleeve 20 upwardly to effect the engagement of the clutch 21—15. As the bar 50 is released the coin drops down into the case 12.

The operator of the car may now drive the car at any desired speed which is registered accurately by the speedometer 11, and this reading may be compared with the reading of the speedometer in the car and its accuracy, or lack of accuracy, noted. It is understood, of course, that the rolls and gears must be properly proportioned to secure the desired result.

In order to enable the driver of the car to drive off from the platform when the desired testing has been accomplished a dog and ratchet 57—58 is inserted between the platform and roller shaft 8 whereby to permit the same to rotate freely in the one direction but to hold it against rotation in the opposite direction to provide traction for the wheels in leaving the platform.

It is to be understood, of course, that while we have herein shown and described but one specific embodiment of the invention, changes in form, construction, and method of assembly and operation may be made within the scope of the appended claims.

We claim:

1. A speedomer testing machine comprising, a normally inoperative master speedometer and supporting means therefor, clutch controlled vehicle actuated means for operating the speedometer, releasable means automatically engageable with the clutch to hold it in an inoperative position, coin controlled means for releasing said last mentioned means, and means rendered operable by the vehicle for rendering the clutch operable.

2. A vehicle speedometer testing machine comprising, a support for a vehicle, a normally inoperative master speedometer and a support therefor, coin controlled vehicle actuated means for rendering the speedometer operative, rollers mounted in the vehicle support to engage the vehicle drive wheels, and roller actuated means for operating the speedometer.

3. A vehicle speedometer testing machine comprising, a vehicle support, a vehicle wheel actuated shaft mounted therein, a master speedometer and a support therefor, shaft actuated operating means connected thereto and having a clutch inserted therein, coin controlled releaseable means for normally holding the clutch in an inoperative position, and means rendered operative by the vehicle to move the clutch into an operative position when released.

4. A vehicle speedometer testing machine comprising, a vehicle support, a pair of vehicle wheel actuated shafts mounted therein, a master speedometer and a support therefor, operating means connecting one of said shafts and said speedometer and having a clutch inserted therein, means for locking the other shaft against rotation in a reverse direction, coin controlled means for normally holding the clutch in an inoperative position, and means rendered operative by the vehicle to move the clutch into an operative position when released.

5. In a machine of the character described, a speedometer and a support therefor, a vehicle drive wheel actuated shaft connected thereto to operate the same and having a clutch inserted therein, a housing for the clutch, a detent and means for urging the detent into engagement with the clutch to normally hold it in an inoperative position, coin controlled means to release the detent from the clutch, a push-rod mounted in the housing, a yoke mounted on the rod and engaging the clutch, a spring mounted on the rod to engage the yoke whereby to advance the yoke and clutch when the latter is released and the rod advanced, and vehicle actuating means for advancing the push-rod to compress the spring.

HENRY C. HAEBERLE.
CLARENCE T. HARRINGTON.